(12) United States Patent
Coffland et al.

(10) Patent No.: US 8,311,658 B2
(45) Date of Patent: Nov. 13, 2012

(54) SYSTEM AND METHOD FOR MONITORING COMPLETED MANUFACTURING OPERATIONS

(75) Inventors: Donald Coffland, Seattle, WA (US); Russell Tice, Renton, WA (US); Sujith Mally, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 404 days.

(21) Appl. No.: 12/145,637

(22) Filed: Jun. 25, 2008

(65) Prior Publication Data

US 2009/0326699 A1  Dec. 31, 2009

(51) Int. Cl.
  *G06F 19/00* (2011.01)
  *G01L 1/00* (2006.01)
  *G08B 1/08* (2006.01)

(52) U.S. Cl. ............ 700/108; 700/96; 700/168; 702/41; 702/150; 340/539.13

(58) Field of Classification Search .............. 700/96, 700/108, 109, 115, 116, 168, 261; 702/41, 702/150, 188; 340/539.13; 455/3.01
See application file for complete search history.

(56) References Cited

U.S. PATENT DOCUMENTS

| | | | |
|---|---|---|---|
| 3,769,860 A | 11/1973 | Frings et al. | |
| 4,403,531 A | 9/1983 | Bailey et al. | |
| 4,546,678 A | 10/1985 | Stuckey | |
| 4,967,472 A | 11/1990 | Ebihara et al. | |
| 5,123,289 A | 6/1992 | Potesta | |
| 5,321,619 A | 6/1994 | Matsuda et al. | |
| 5,743,158 A | 4/1998 | Perkins | |
| 5,898,379 A | 4/1999 | Vanbergeijk | |
| 5,992,436 A * | 11/1999 | Hellman et al. | 137/1 |
| 6,021,694 A | 2/2000 | Beger | |
| 6,260,043 B1 | 7/2001 | Puri et al. | |
| 6,301,999 B1 | 10/2001 | Garg | |
| 6,710,776 B2 | 3/2004 | Usaki | |
| 6,796,190 B2 | 9/2004 | Curry | |
| 6,882,315 B2 | 4/2005 | Richley et al. | |
| 6,922,599 B2 * | 7/2005 | Richey | 700/98 |
| 6,927,688 B2 | 8/2005 | Rapaich | |
| 6,968,759 B2 | 11/2005 | Becker et al. | |
| 7,035,877 B2 | 4/2006 | Markham et al. | |
| 7,055,233 B1 | 6/2006 | Hofer et al. | |

(Continued)

FOREIGN PATENT DOCUMENTS

DE  102005016361 A1  10/2006

(Continued)

OTHER PUBLICATIONS

Agarwal et al., "Dead Reckoning in Mobile Ad-Hoc Networks," IEEE Wireless Communications and Networking Conference, vol. 3, Mar. 2003, pp. 1838-1843.

(Continued)

*Primary Examiner* — Sean Shechtman
(74) *Attorney, Agent, or Firm* — Yee & Associates, P.C.

(57) ABSTRACT

An electronic torque wrench having a flexible head provides accurate torque measurements irrespective of the angular position of the head relative to a handle on which the force is applied. The head includes first and second portions connected by at least three pivotal links. One of the links is used to react against the entire torque applied to the handle, regardless of the pivotal position of the handle. An electronic strain gauge on the torque-reacting link provides a measurement of the torque applied to the fastener.

23 Claims, 11 Drawing Sheets

U.S. PATENT DOCUMENTS

| | | | |
|---|---|---|---|
| 7,089,834 B2 | 8/2006 | Reynertson et al. | |
| 7,819,025 B2 | 10/2010 | Coffland | |
| 7,876,216 B2 | 1/2011 | Coffland et al. | |
| 2001/0006384 A1* | 7/2001 | Usaki | 345/204 |
| 2003/0158795 A1* | 8/2003 | Markham et al. | 705/28 |
| 2004/0108954 A1 | 6/2004 | Richley et al. | |
| 2004/0159164 A1 | 8/2004 | Curry | |
| 2005/0092143 A1 | 5/2005 | Lehnert et al. | |
| 2007/0221015 A1 | 9/2007 | Hsieh | |
| 2008/0018912 A1 | 1/2008 | Schreiber | |
| 2008/0177417 A1* | 7/2008 | Kasuga et al. | 700/213 |
| 2008/0178713 A1* | 7/2008 | Long et al. | 81/467 |
| 2008/0306622 A1 | 12/2008 | Bailey et al. | |
| 2009/0192644 A1* | 7/2009 | Meyer et al. | 700/109 |
| 2009/0320653 A1 | 12/2009 | Coffland | |
| 2009/0322516 A1 | 12/2009 | Coffland et al. | |
| 2011/0164657 A1 | 7/2011 | Coffland et al. | |

FOREIGN PATENT DOCUMENTS

| | | | |
|---|---|---|---|
| DE | 102006044937 A1 | 4/2008 | |
| EP | 1859906 A2 | 11/2007 | |
| EP | 1930240 A1 | 6/2008 | |
| EP | 2138275 A2 | 12/2009 | |
| EP | 2138861 A1 | 12/2009 | |
| EP | 2138920 A2 | 12/2009 | |
| JP | 2004118304 A | 4/2004 | |
| JP | 2006098186 A | 4/2006 | |
| WO | 8700109 A1 | 1/1987 | |
| WO | 03041914 A2 | 5/2003 | |

OTHER PUBLICATIONS

Chou, "Evaluation of UWB Techniques for Indoor Position Locationing," Master's Thesis, Oregon State University, Jun. 2005, pp. 1-51.

Chung et al., "An Accurate Ultra Wideband (UWB) Ranging for Precision Asset Location," IEEE Conference on Ultra Wideband Systems and Technologies, Nov. 2003, pp. 389-393.

Eltaher et al., "A Novel Approach based on UWB Beamforming for Indoor Positioning in None-Line-of-Sight Environments," RadioTeCe, Oct. 2005, 5 pages.

Fontana et al., "Commercialization of an Ultra Wideband Precision Asset Location System," IEEE Conference on Ultra Wideband Systems and Technologies, Nov. 2003, pp. 369-373.

"GCI Torque Reaction Arms—SmartARM," GCI, 1 page, accessed Mar. 7, 2012, http://www.gcilift.com/SmartARM_2008.pdf.

EP search report dated Feb. 10, 2010, regarding application EP 09251348 (EP 2138275), 2 pages.

EP search report dated Sep. 14, 2009, regarding application EP 09251616 (EP 2138861), 3 pages.

Jo et al., "Accuracy Enhancement for UWB Indoor Positioning Using Ray Tracing," IEEE/ION Position, Location, and Navigation Symposium, Apr. 2006, pp. 565-568.

Low et al., "Pulse Detection Algorithm for Line-of-Sight (LOS) UWB Ranging Applications," IEEE Antennas and Wireless Propagation Letters, Jun. 2005, pp. 63-67.

Perkins et al., "Ad-hoc On-Demand Distance Vector Routing," Second IEEE Workshop on Mobile Computing Systems and Applications, Feb. 1999, pp. 90-100.

"Robust Header Compression WG (ROHC)," 61st IETF, Nov. 2004, 52 pages, http://www.ietf.org/proceedings/61/slides/rohc-0.pdf.

Shah et al., "Enhanced Position Location with UWB in Obstructed LOS and NLOS Multipath Environments," EUSIPCO 2005 13th European Signal Processing Conference, Sep. 2005, 4 pages.

"Snap-On Techwrench Technical Page," Snap-On Incorporated, Nov. 2005, 9 pages, http://buy1.snapon.com/products/torque/pdf/techwrench/TECHWRENCH%20INTERNET%20SITE.pdf.

"Indoor Positioning," Thales Research and Technology (UK) Ltd., Jun. 2006, 1 page, http://web.archive.org/web/20060621031919/http:—thalesresearch.com/Default.aspx?tabid-166.

Zhao et al., "UWB Positioning Using Six-Port Technology and a Learning Machine," IEEE Mediterranean Electrotechnical Conference, May 2006, pp. 352-355.

USPTO Office Action, dated Jul. 26, 2010, regarding U.S. Appl. No. 12/145,604, 6 pages.

USPTO Notice of Allowance, dated Dec. 8, 2010, regarding U.S. Appl. No. 12/145,604, 7 pages.

USPTO Office Action, dated Nov. 17, 2009, regarding U.S. Appl. No. 12/145,623, 10 pages.

USPTO Notice of Allowance, dated Apr. 12, 2010, regarding U.S. Appl. No. 12/145,623, 5 pages.

USPTO Notice of Allowance, dated Jun. 22, 2010, regarding U.S. Appl. No. 12/145,623, 8 pages.

USPTO Office Action, dated Jul. 21, 2011, regarding U.S. Appl. No. 12/835,092, 10 pages.

USPTO Notice of Allowance, dated Dec. 12, 2011, regarding U.S. Appl. No. 12/835,092, 8 pages.

USPTO Notice of Allowance, dated Apr. 2, 2012, regarding U.S. Appl. No. 12/835,092, 13 pages.

* cited by examiner

SYSTEM AND METHOD FOR MONITORING COMPLETED MANUFACTURING OPERATIONS

CROSS REFERENCE TO RELATED APPLICATIONS

This application is related to co-pending U.S. patent application Ser. Nos. 12/145,604, and 12/145,623 both filed concurrently herewith on Jun. 25, 2008, each of which applications is incorporated by reference herein in its entirety.

TECHNICAL FIELD

This disclosure generally relates to manufacturing operations, and deals more particularly with a system and related method for locating and reporting completed manufacturing operations, especially those involving the assembly of parts.

BACKGROUND

During the production of complex assemblies, such as aircraft, there is sometimes a need to monitor manufacturing operations and verify that certain operations or procedures have been properly performed. For example, aircraft landing gear may be controlled by hydraulic systems comprising hundreds of hydraulic tubes and fittings that must be assembled within a relatively small space within a wheel well. Each of these fittings may include a nut that is tightened or "torqued" by an assembly worker to a nominal torque value. Because of the large number of nuts that must be torqued, it is desirable to both monitor which nuts have been torqued, and verify that the nuts have been torqued to the correct values, since the failure to properly assemble fittings, and/or torque nuts to nominal values may result in hydraulic leaks that must be later corrected. Past attempts to monitor and verify nut torquing have involved an assembly worker painting marks on the nuts to visually indicate that they have been torqued, however this technique may be subject to human error, and in any event, may not allow verification that the nut has been torqued to the correct value.

Verifying that nuts have been torqued to the correct values may be particularly challenging where they are tightly clustered, or are located near obstructions that prevent an assembly worker from using a conventional torque-reading wrench to tighten the nuts. In these limited clearance situations, the assembly worker must use off-axis wrenches that may not provide an accurate indication of the torque value. Accordingly, the assembly worker must resort to non-precise techniques used for estimating the amount of torque needed to tighten the nut.

Accordingly, there is a need for a system for monitoring and verifying the completion of certain manufacturing operations, such as torquing of nuts, particularly in an aircraft assembly environment.

SUMMARY

The disclosed embodiments provide a system for monitoring the completion of manufacturing operations in a manufacturing environment and are particularly useful where a large number of similar or identical operations are required to be performed and it is necessary to monitor those operations have been performed and those that are yet to be performed. The disclosed system allows remote monitoring of the completion of operations, as well as local monitoring by an assembly worker so that the worker can quickly determine which operations have already been completed. In one embodiment, the system may be used for determining when operations have been performed on subassemblies or groups of assemblies.

In addition to monitoring the completion of manufacturing operations, the system may transmit data representing a condition, such as a torque value in applications where the system is used to monitor torquing of nuts within a wheel well of an aircraft. The disclosed embodiments may include a display system that provides an image of the completed operation within a three dimensional display of its surrounding environment, as well as a display of the acquired data relating to the operation that has been completed.

According to one disclosed embodiment, a system is provided for monitoring the completion of manufacturing operations in a manufacturing environment, comprising: means for determining when an operation has been completed; means for wirelessly transmitting a signal from the location of the operation indicating the operation has been completed; means for locating the 3D position of the operation in a coordinate system of the manufacturing environment based on the transmitted signal; a data set representing a 3D image of the manufacturing environment; and, means for displaying the 3D image of the manufacturing environment and for displaying the location of the completed operation within the 3D image. The means for determining whether an operation has been completed may include a tool for completing the operation wherein the wireless transmitting means is carried on the tool. In one application, the tool may comprise a torque wrench including a strain gauge sensor for sensing the applied torque.

According to another disclosed embodiment, a system is provided for monitoring the completion of an operation performed on subassemblies within a manufacturing environment, comprising: a portable tool for performing an operation on each of the subassemblies; a wireless transmitter on the tool for wirelessly transmitting a signal indicating the tool has completed an operation on one of the subassemblies; means for locating the position of the tool in a first 3D coordinate system in the manufacturing environment, based on the transmitted signal; a data set representing a 3D image of the manufacturing environment in a second 3D image coordinate system; a processor coupled with a locating means and the data set for converting the 3D position of the tool located in the first coordinate system to a 3D position in the second coordinate system; and, display means for displaying the location of the tool in a 3D image of the manufacturing environment. The tool may comprise a torque wrench including means for sensing when the torque wrench has applied a preselected level of torque to the subassembly, and a trigger circuit for triggering the operation of a wireless transmitter. The manufacturing environment may comprise a harsh radio frequency (RF) environment and the transmitted signal may comprise an ultra wideband (UWB) pulse signal. The manufacturing environment may comprise an aircraft undergoing assembly and the subassemblies may include fasteners tightened by the tool.

According to a disclosed method embodiment, monitoring operations performed on subassemblies within a manufacturing environment comprises: moving a tool to the location of one of the subassemblies; using the tool to complete an operation on the subassembly; wirelessly transmitting a signal from the tool indicating that the operation of the subassembly has been completed; receiving the transmitted signal; using the received signal to locate the position of the tool in a 3D coordinate system of the manufacturing environment; providing a 3D data file representing a 3D image of the manufacturing environment; converting the located position of the tool in the 3D coordinate system of the manufacturing environment to a position in the coordinate system of the 3D image of the manufacturing environment; and, displaying the subassembly on which the operation was completed within the 3D image of the manufacturing environment. The subassemblies may comprise fasteners, and moving the tool may include moving a wrench to a fastener on the subassembly where it is used to tighten the fastener. The method may further comprise measuring the level of torque applied to the fastener, and transmitting the wireless signal may include transmitting the measured level of torque.

The disclosed embodiments satisfy a need for monitoring the completion of manufacturing operations in a manufacturing environment in which operations are automatically located and displayed.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
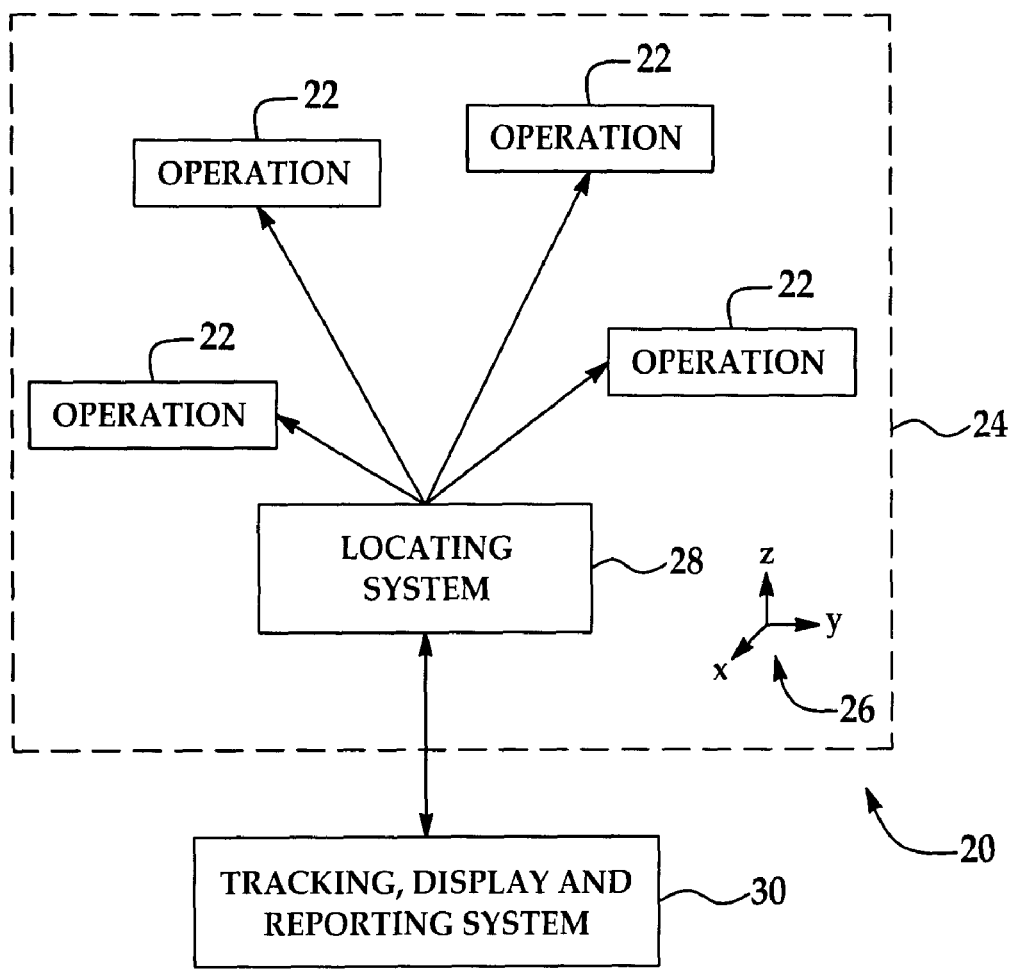
FIG. 1 is a block diagram of a system for locating the completion of manufacturing operations.

Referring first to FIG. 1, a system generally indicated by the numeral 20 may be used for locating each of a plurality of manufacturing operations 22 within a manufacturing 24, and for reporting the status of at least one operation at the located manufacturing. The reported status may including notice that the operation has been started, is underway and/or has been completed. The three dimensional location of each of the operations 22 may be defined in a three dimensional coordinate system 26 within the manufacturing environment 24. In one embodiment, the manufacturing environment may be a harsh RF environment in which obstructions or other environmental factors result in RF signal reflection, signal attenuation and/or signal blockage due to the lack of LOS between transmitter and receiver.

The locating and reporting system 20 may include a locating system 28, and a reporting and display system 30 which can be used to monitor the location of the manufacturing operation 22 within the coordinate system 26 and display these operations as well as the status of the manufacturing operation 22 within a second, later discussed coordinate system. As will be discussed below in more detail, the system 20 may be used to locate each of the manufacturing operations 22 directly or indirectly by locating a portable component such as a torque wrench which is moved to the location of each of the manufacturing operation 22.

Figure 2:
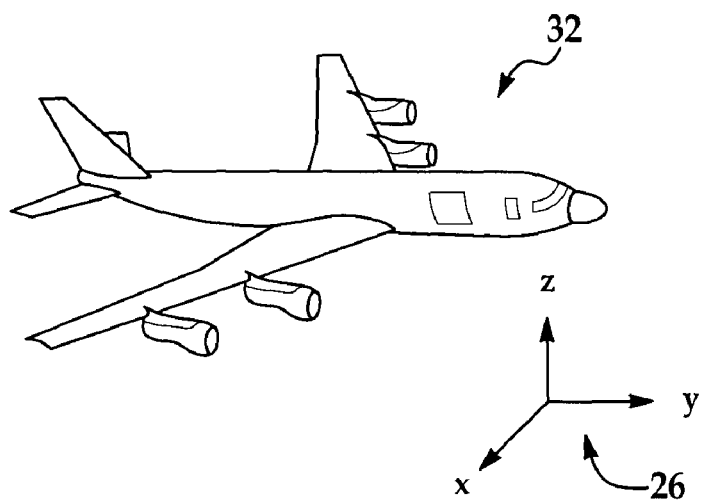
FIG. 2 is a perspective view of an aircraft, including a three dimensional coordinate system used to define the location of manufacturing operations performed within the aircraft.
Figure 3:
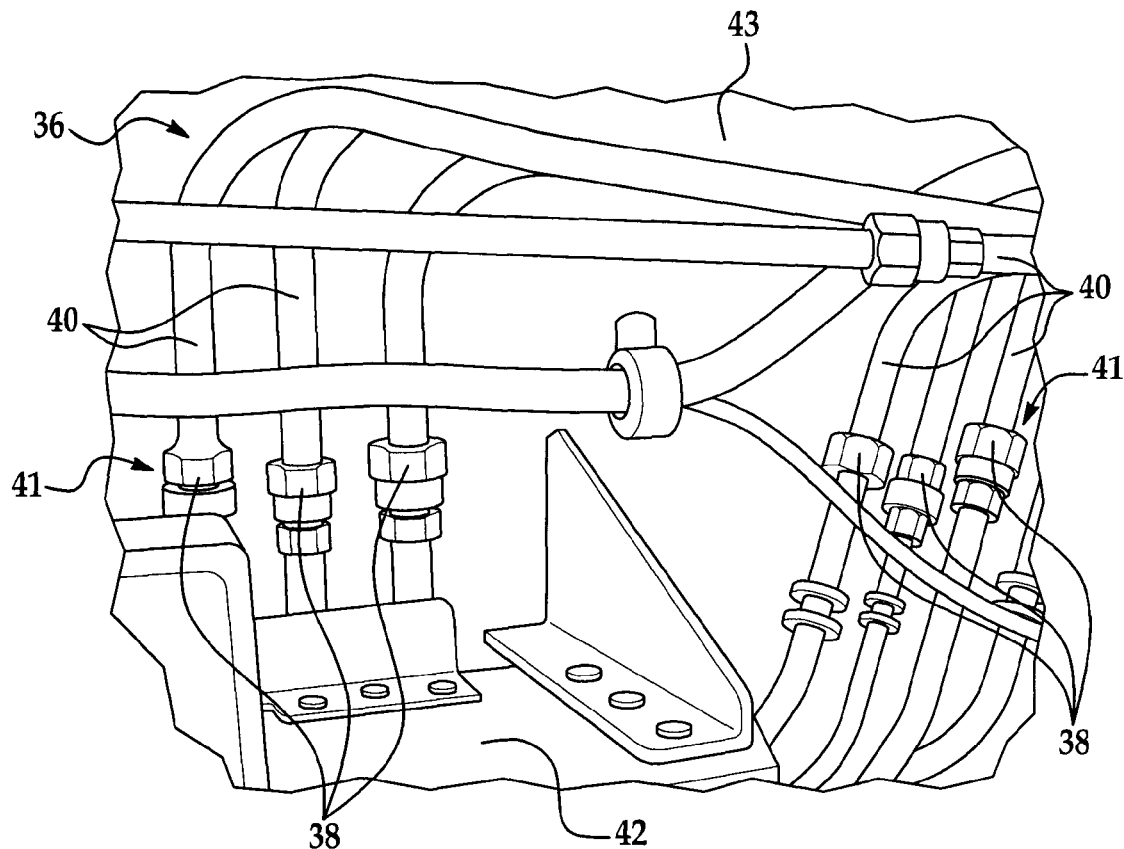
FIG. 3 is a perspective view showing a portion of a wheel well forming part of the aircraft shown in FIG. 2.

Referring to FIG. 2, the locating and reporting system 20 may be used to locate manufacturing operations 22 on an aircraft 32, in which object space may be defined in a three dimensional coordinate system 26 of the aircraft 32. The manufacturing operations 22 may comprise, for example and without limitation, operations such as the assembly of subassemblies (not shown) during the production of the aircraft 32. For example, as shown in FIG. 3, a wheel well 36 on the aircraft 32 may contain a multiplicity of hydraulic tubes 40 having threaded fittings 41 provided with nuts 38 for connecting and tightening the fittings 41. The assembly of the fittings 41, including torguing of the nuts 38, comprises assembly operations that may be monitored and reported using the disclosed system 20. The wheel well 36 may include various metallic structures 42 used for reinforcement or component mounting that preclude LOS within the wheel well 36 and/or reflect or attenuate RF signals. In some cases, the nuts 38 may be located in close quarters to which there may be limited access, as where they are tightly grouped, for example, against a bulkhead 43.

Figure 4:
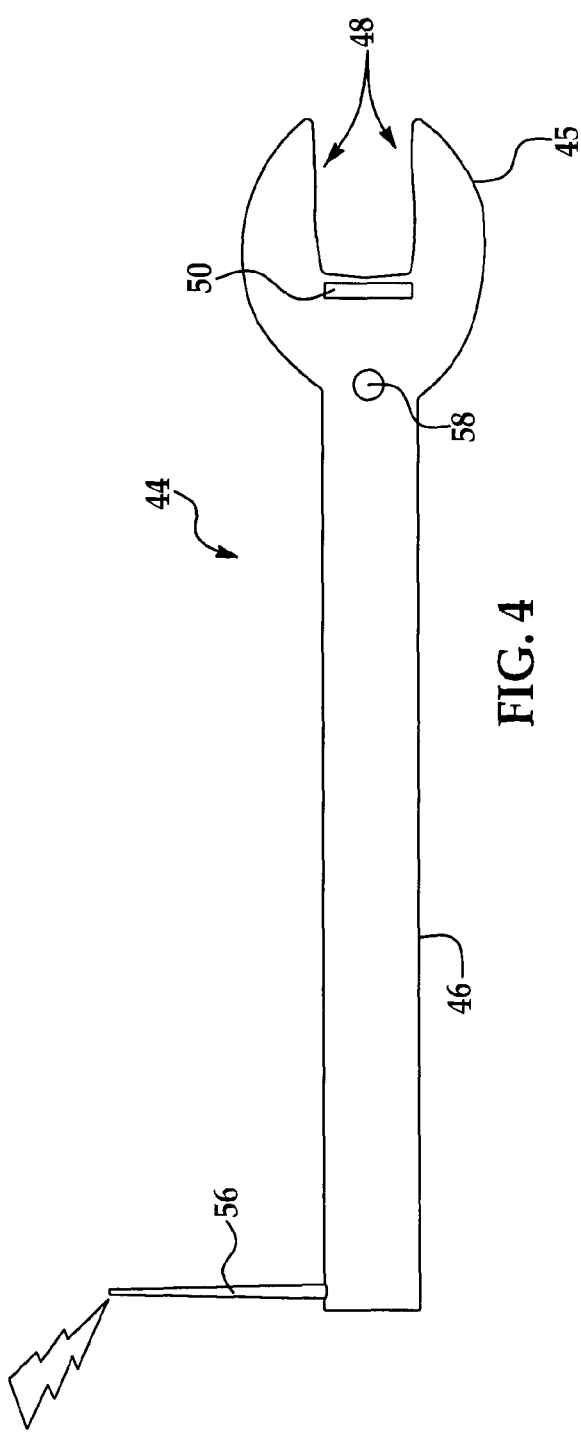
FIG. 4 is a side view of one embodiment of a wrench used to torque nuts on hydraulic fittings within the wheel well shown in FIG. 3.
Figure 5:
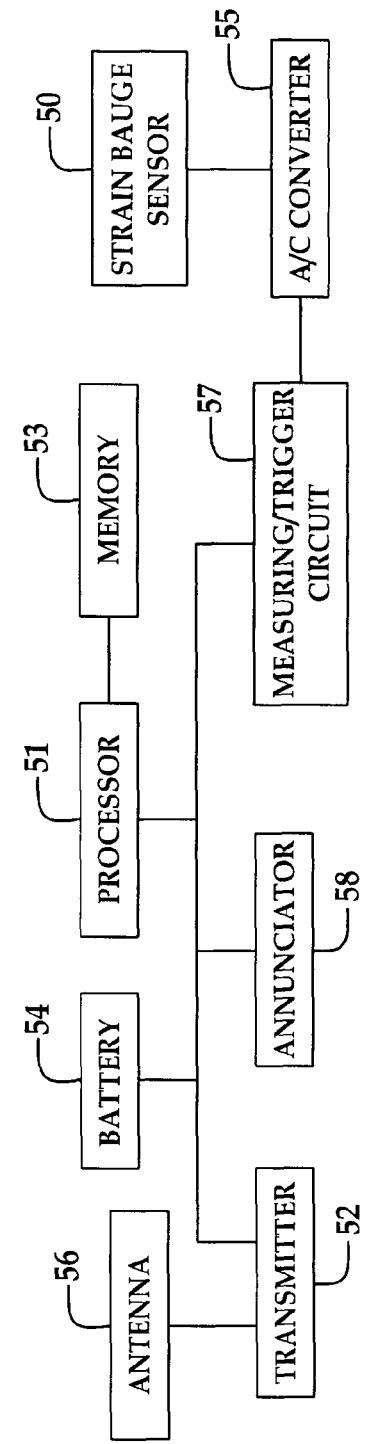
FIG. 5 is a block diagram of a circuit forming part of the torque wrench shown in FIG. 4.
Figure 6:
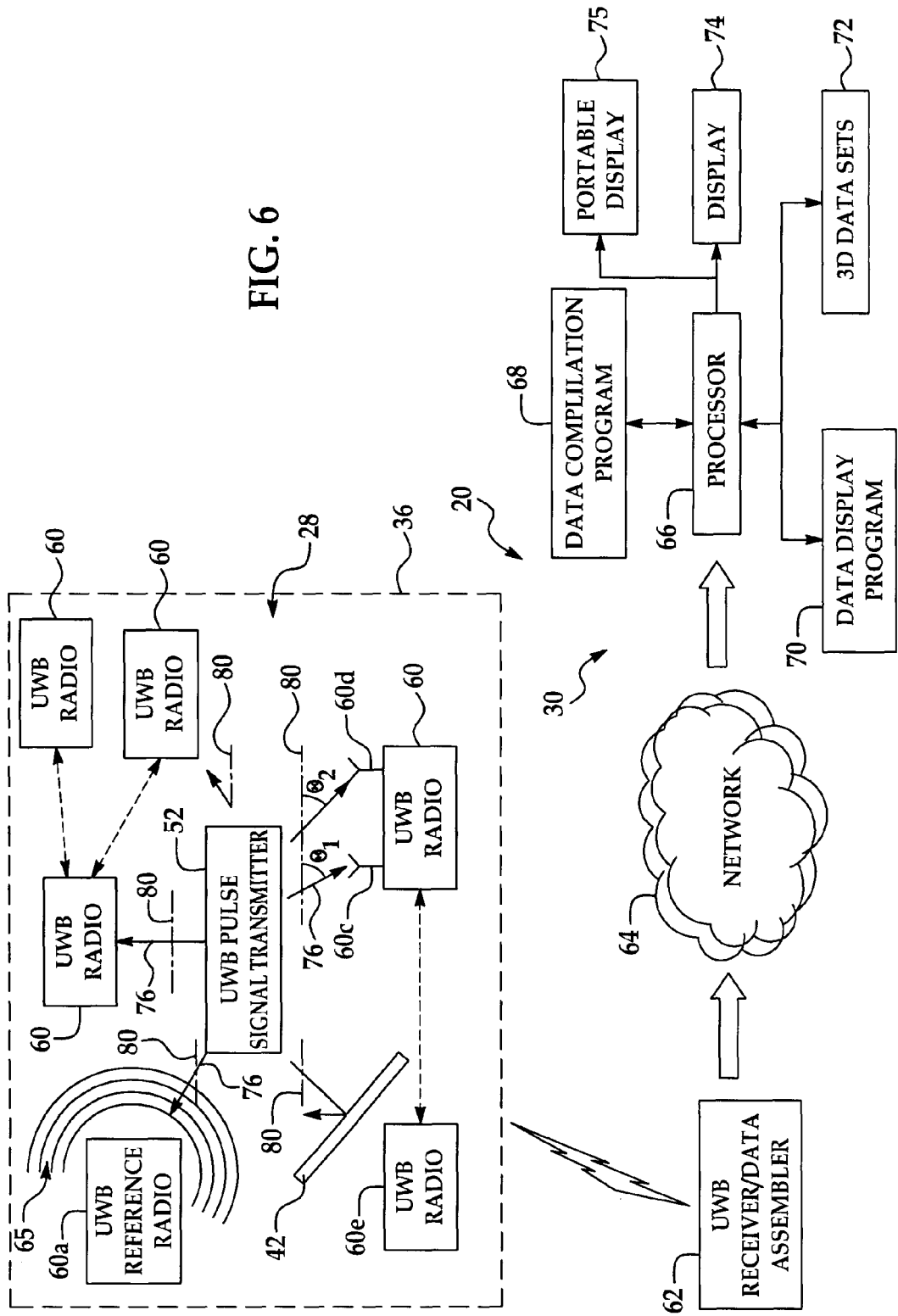
FIG. 6 is a combined block and diagrammatic illustration of a system for locating and reporting the completion of manufacturing operations performed in a harsh RF environment.

Reference is now made to FIGS. 4-8 which depict additional details of the locating and reporting system 20 adapted for use in locating and reporting the torque condition of the nuts 38. In this application, as best seen in FIG. 6, the system 20 may utilize a UWB pulse signal locating system 28 which comprises a UWB pulse signal RF transmitter 52 carried on an electronic torque wrench 44, and a plurality of UWB radios 60 that are optimally positioned within the wheel well 36 such that at least two of the UWB radios 60 are within the LOS of each of the nuts 38.

As shown in FIG. 4, the electronically monitored torque wrench 44 used to torque the nuts 38 includes a head 45 mounted on the end of a handle 46. The head 45 includes jaws 48 for engaging the flats of the nuts 38, and a strain gauge sensor 50 mounted near the jaws 48. The strain gauge sensor 50 produces an electrical signal related to the magnitude of the torque applied to a nut 38 by the wrench 44.

Additional components contained within the wrench 44 are shown in FIG. 5. The UWB pulse signal transmitter 52 is contained within the handle 46 and transmits UWB pulse signals on an antenna 56 carried on or within the handle 46. The UWB pulse signals transmitted by the UWB pulse signal transmitter 52 may include data representing the magnitude of torque sensed by the strain gauge sensor 50, or more simply that a torque of unreported value has been applied. The analog signal generated by the strain gauge sensor 50 may be converted to a digital signal by an A-to-D converter 55. A measuring/trigger circuit 57 measures the digital signal and issues a trigger signal when the measured signal exceeds a threshold value, indicating, for example, that a nut has been torqued to a nominal value, or has surpassed a minimum threshold to indicate torque has been or is being applied. A microprocessor 51 and associated memory control various operations of the wrench, including the transmitter 52 and an annunciator 58 on the wrench head 45 which alerts assembly worker that the torque being applied to a nut 38 has reached a nominal value, which may be stored in the memory 53. The annunciator 58 may comprise for example and without limitation, an LED or other light (shown at 58), an audio signal generator (not shown) or a vibrator (not shown) in the handle 46. The electronic components of the wrench 44, including the transmitter 52 may be powered by a battery 54 housed within the handle 46. It may be possible to retrofit conventional wrenches with one or more of the electronic components mentioned immediately above to provide the required functions of the electronic torque wrench 44.

Certain manufacturing operations requiring the use of the electronic torque wrench 44 may be conducted within harsh RF environments, such as the illustrated aircraft wheel well application, that lack infrastructure which could otherwise provide references useful in making location measurements. Accordingly, in harsh RF environments, the nodes, i.e. radios 60 may be deployed at positions that optimize LOS communication with the locations where the nuts 38 are to be torqued. The common coordinate system 26 established within the wheel well 36 allows estimations of locations within a common frame of reference. It may also be desirable to optimize the transmission protocol in order to reject reflective signals by using timing techniques carried in the leading edge of the transmitted, UWB pulse signals.

According to one embodiment, the generated pulse signals may be baseband signals that are mixed by a mixer to move their center frequency to the desired frequency bands which may be, in an application involving monitoring of nut torquing within a wheel well 36, around 4 GHz, providing an effective spectrum of approximately 3.1 to 5.1 GHz, and location measurement accuracy less than approximately one-half inch. In other applications, a UWB pulse signal generator 52 having a center frequency of approximate 6.85 GHz for a full FCC part 15 spectrum spread of 3.1-10.6 GHz, may be appropriate.

In accordance with the disclosed embodiments, the deployment of ad hoc nodes in the form of the radios 60 can be used to navigate around any blockages in the LOS between the location of the pulse signal generator 52 and the radios 60. Various reference materials exist in the art which teach suitable methods and techniques for resolving positional estimates in a network of ad hoc nodes including, for example and without limitation the following:

Perkins, C., "Ad hoc On-Demand Distance Vector (AODV) Routing", Network Working Group, RFC 3561, July 2003. Agarwal, A. and S. Das, "Dead Reckoning in Mobile Ad-Hoc Networks", IEEE WCNC 2003, the 2003 IEEE Wireless Communications and Networking Conference, March 2003. Thales, Research & Technology Ltd. "Indoor Positioning", Some of the techniques well known in the art use iterative lateration of the generated pulse signals by solving a constraint based positional model. While this approach may be satisfactory for some applications, in other applications, such as locating nuts within an aircraft wheel well, it may be necessary that the ad hoc network be propagated with position aware nodes in order to provide the desired results.

As will be discussed below in more detail, the UWB radios 60 receive the pulse signals from the wrench 44 and generate location measurements that may be used to calculate the location of the wrench 44, and thus, the location of the nut 38 being torqued by the wrench 44. In other embodiments, it may be possible to use one or more UWB radios 60b which include a pair of spaced apart receiving antennas 60c, 60d. The UWB radio 60b generates location measurements based on the angle of arrival (AOA) and the time difference of arrival (TDOA) of the pulse signals 76 transmitted by the pulse signal transmitter 52 on the wrench 44. In the case of the UWB radio 60b, the pulse signals 76 arrive respectively at the two antennas 60c, 60d at slightly different angles θ1 and θ2 relative to a reference axis 80 that is based in the coordinate system 26 (FIGS. 1 and 2) used to locate the nuts 38 in the three dimensional object space. Similarly, UWB radios 60 each measure the AOA and TDOA of the arriving pulse signals 76 relative to the reference axis 80. The AOA and TDOA measurements generated by at least two of the radios 60 may then be used to calculate the three dimensional location of the pulse signal transmitter 52 (and thus the wrench 44 and nut 38) using common iterative lateralization techniques.

Any of several different techniques may be employed for measuring the AOA positioning. One such method has been previously described in which the UWB radio 60b includes two spaced apart receiving antennas 60c, 60d each of which receives the signal transmitted by the pulse signal transmitter 52. The angle of the line connecting the radio 60 and the torque wrench 44 is measured with respect to source data stored in the 3D data set files 72. This reference angle corresponds to the orientation of the line intersecting each of the collocated antennas 60c, 60d. By measuring orientation to multiple reference antennas, the position of the torque wrench 44 may be determined.

Various techniques can be used for measuring TDOA. One such method involves receiving the transmitted pulse signals by multiple UWB radios 60 and dedicating one of the receiving radios 60a to calibrating the remaining radios 60 in the network. The receiving radio 60 determines the direct path to the intended torque wrench 44 by measuring the TDOA of the signal. At least four such measurements may be required to determine the position of the torque wrench 44 by interative lateration.

The performance of the radios 60 may be measured in terms of the packet success rate, accuracy of measured vs. actual distance, standard deviation and the signal/noise levels. The packet success rate may be defined as the number of successful packet exchanges between the radios 60. The measured distance is computed by processing the UWB pulse signals transmitted by the pulse signal transmitter 52. The actual distance is the distance between two receiving radios 60 as measured using a physical device. The standard deviation is a measure of how widely the measured distance values are dispersed from the mean. The signal and noise levels may be computed from the signal waveform as follows:

$$SignalLevel = 10 * \log\left(\frac{SquareofMaxValueofADCCounts}{2}\right)$$

$$NoiseLevel = 10 * \log(NoiseVarianceof5nsOfTheWaveform)$$

The system 28 may include a UWB reference radio 60a which broadcasts a beacon signal 65 that is used to calibrate the UWB radios 60. Because of the close quarters and various obstructions such as structure 42 that may be present within the wheel well 36, one or more of the UWB radios, such as UWB radio 60c may not be within the LOS of the pulse signal transmitter 52. The required accuracy or location measurement where the LOS between the transmitter 52 and one of the radios 60 is blocked can be overcome by installing extra radios 60 over the minimum number required for normal TDOA calculations, and then performing signal processing algorithms to identify the particular receiver that is not within LOS with the pulse signal transmitter 52.

The location measurements generated by the UWB radios 60 may be transmitted from the system 28 to a UWB receiver and data assembler 62 which assembles the location measurements, along with the torque data forming part of the pulse signals transmitted from the wrench 44. Depending upon the application, the assembled data may be transmitted through a network 64 to the monitoring, display and reporting system 30. The networks 54 may comprise, for example and without limitation, a WAN, LAN or the Internet. The monitoring, display and reporting system 30 may include a processor 68, data compilation program 68, data display program 70, three dimensional data set files 72 and one or more displays, such as the display 74 and a portable display 75.

The processor 66 may comprise a programmed PC which uses the compilation program 68 to calculate the position of the pulse signal transmitter 52 based on the location measurements. The processor 66 also uses the display program 70 to cause the display of images which illustrate or highlight the location of the nut 38 being torqued within a three dimensional image produced from the data set files 72. The three dimensional data set files 72 may comprise, for example and without limitation, a CAD file produced by any of various solid modeling programs such as, without limitation, CATIA. In effect, the system 30 maps the locations of the nuts 38 to data set coordinates in the solid modeling program.

Figure 7:
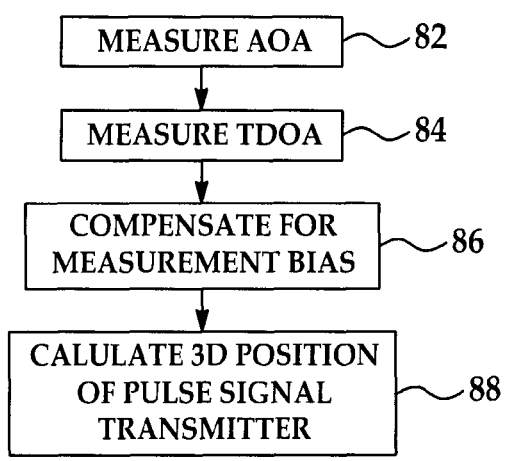
FIG. 7 is a simplified flow diagram of a method for locating the three dimensional position of the pulse signal transmitter forming part of the system shown in FIG. 6.

The method for calculating the position of the pulse signal transmitter 52 is illustrated in FIG. 7 in which the AOA and TDOA are respectively measured at 80 and 84 by the UWB radios 60. In some cases, measurement bias may be introduced as a result of the lack of LOS between radios 60, and incorrect lock on the signal to detect direct path or leading edge of the signal. This is due to the consistent leading edge detection occurring at the shortest path between the radios 60. This measurement bias may be compensated using any of several methods, including using leading edge algorithms using look-up tables for regions within the wheel well 36 to compensate for the bias or for counting for the error as position errors. Accordingly, compensation may be made at 86 for the measurement bias. Finally, at 88, the processor 66 calculates the three dimensional position of the pulse signal transmitter 52 within the coordinate system 26 of the manufacturing environment 24, which in the illustrated example, comprises the wheel well 36.

Figure 8:
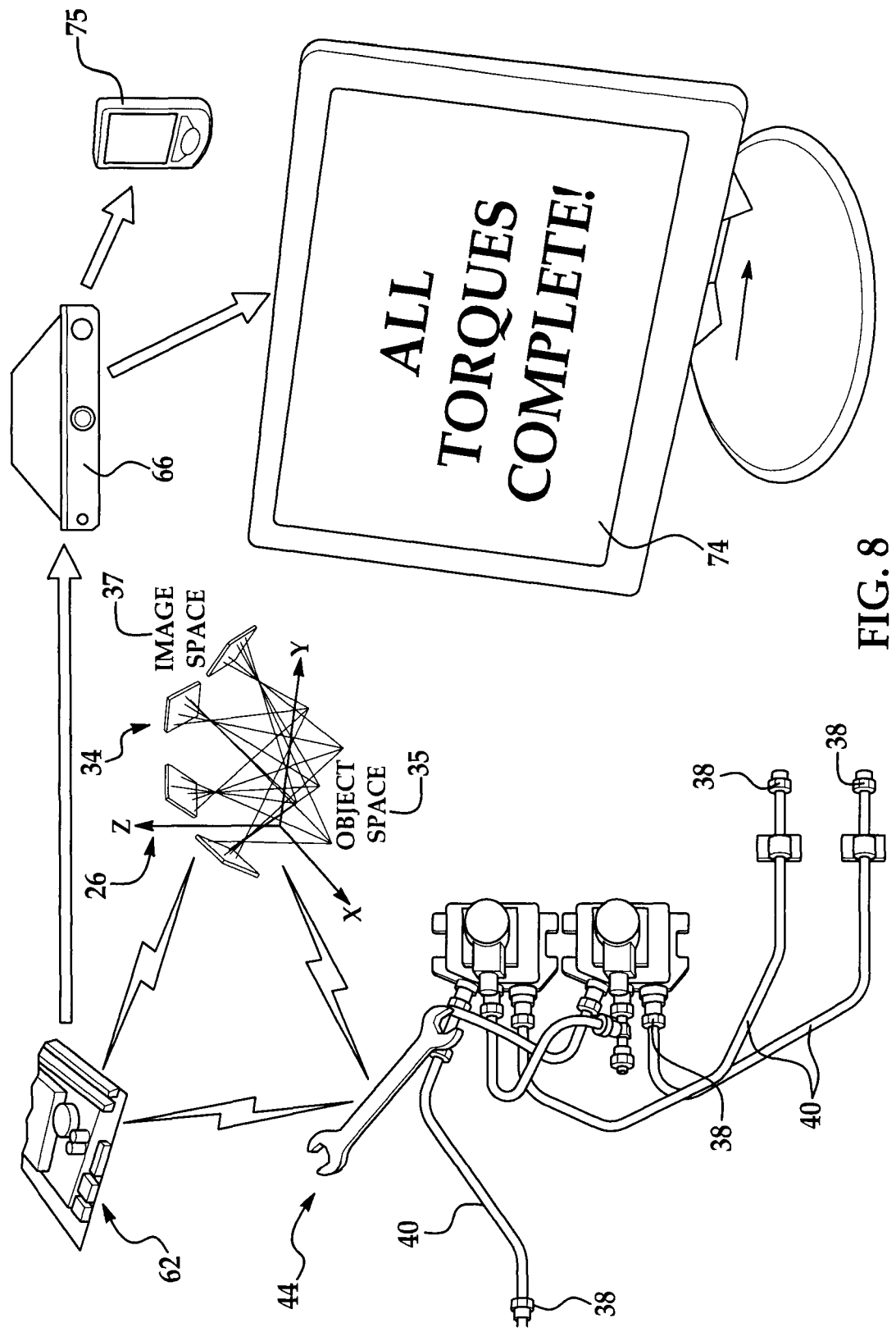
FIG. 8 is a diagrammatic illustration showing the major components of the system for locating and reporting the completion of manufacturing operations.

Referring now particularly to FIG. 8, the displays 74, 75 each combine graphic and quantitative data in real time to provide a display of the current state of the wheel well 36. In order to display the nut 38 being torqued in a three dimensional reference image assembled from the 3D data set files 72, the processor 66 mathematically translates the 3D location of the pulse signal transmitter 52 in the coordinate system 26 of wheel well 36, to a second coordinate system 34 of the 3D image created from the data set files 72. The first coordinate system 26 effectively defines object space 35, i.e. the 3D space in which the wrench 44 is moved from nut-to-nut 38, and the coordinate system 34 defines the image space 37 containing the displayed the image created from the 3D data set files 72.

The main display 74 may be used by production personnel to remotely locate, monitor and record the status (e.g. initiation, progress and/or completion), of assembly operations, such as the torquing of the nuts 38. Additionally, a portable display 75 may be employed by an assembly worker to view the same or similar data that is displayed on display 74 so that the worker can monitor and verify which of the nuts 38 have been torqued, or have yet to be torqued.

Figure 9:
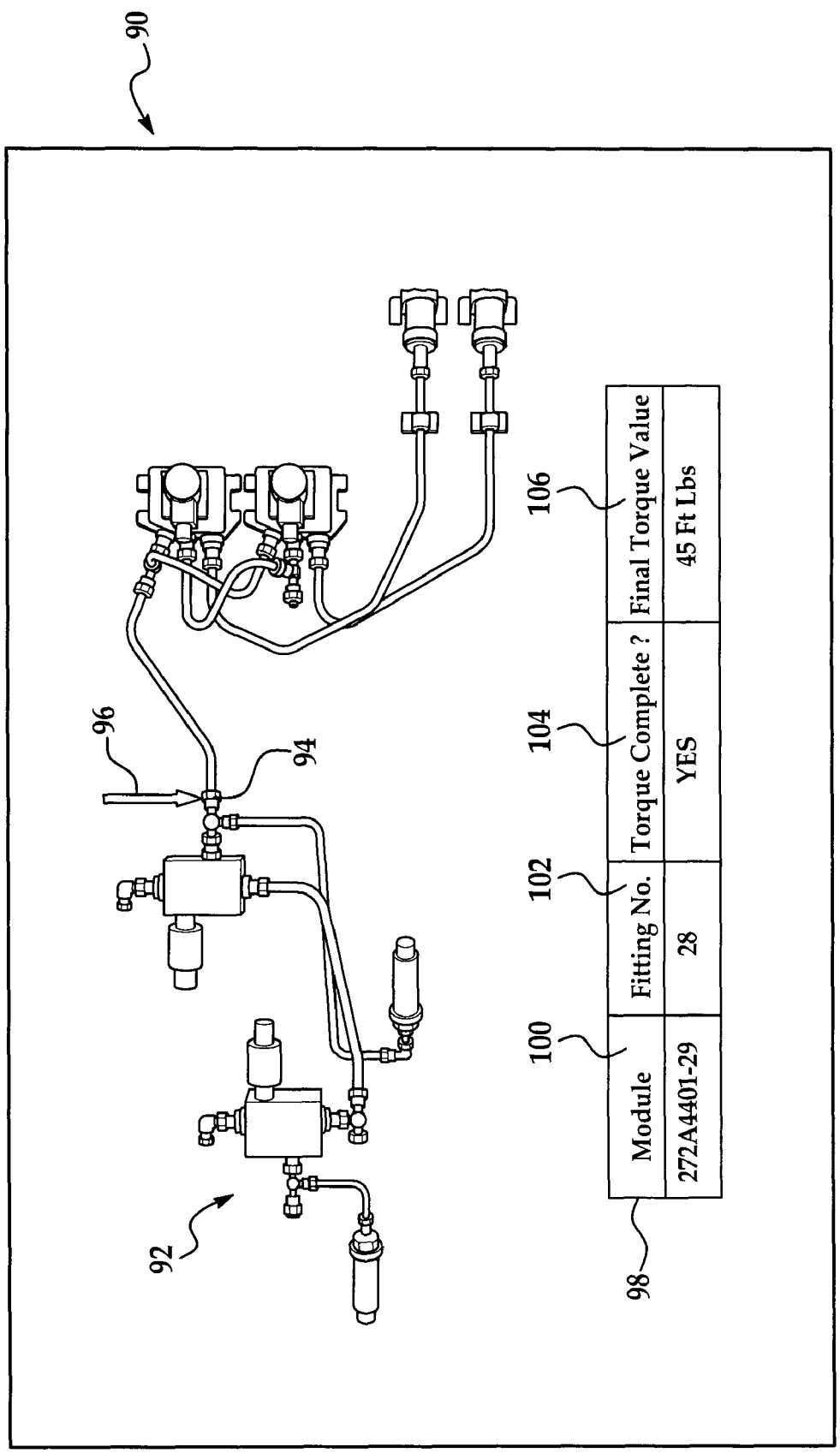
FIG. 9 is one typical screen display showing a located manufacturing operation and reported completion status.

Reference is now made to FIG. 9 which discloses a typical screen display 90 that may be viewed on either of the displays 74, 75. In this example, a hydraulic module 92 is displayed in which an arrow 96 is used to indicate a particular nut 94 that is or has just been torqued. Summary information in a table 98 may also displayed which may indicate a module number 100 identifying the module 92, a fitting number 102 identifying the particular fitting being torqued, the status 104 of torque completion and a final torque value 106.

Figure 10:
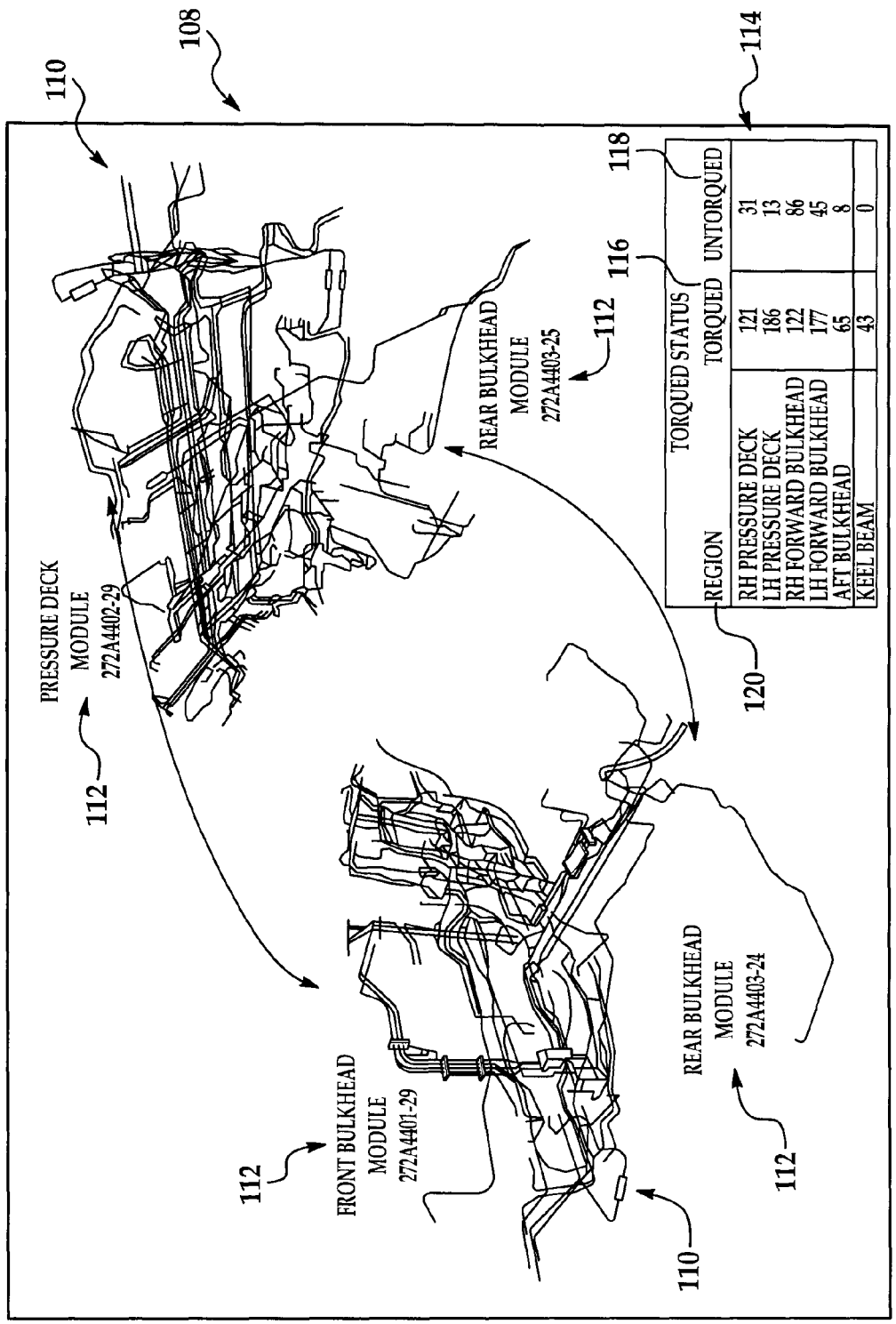
FIG. 10 is another screen display showing summary information related to manufacturing operations and reported completion status.

Referring now also to FIG. 10, summary information may be displayed on the display 74 that may include groups 110 of modules along with indicia 112 that identifies the module group. Additionally, tables 114 may be displayed that show torque status in summary form. For example, the torque status may include the number 116 of nuts that have been torqued for a module group 110, and the number 118 of nuts that have not yet been torqued for each of the module group regions 120. A variety of other types of specific of summary information may be displayed along with images of the modules and/or fittings, all in real time while an assembly worker is assembling the fittings and torquing the nuts 38.

Figure 11:
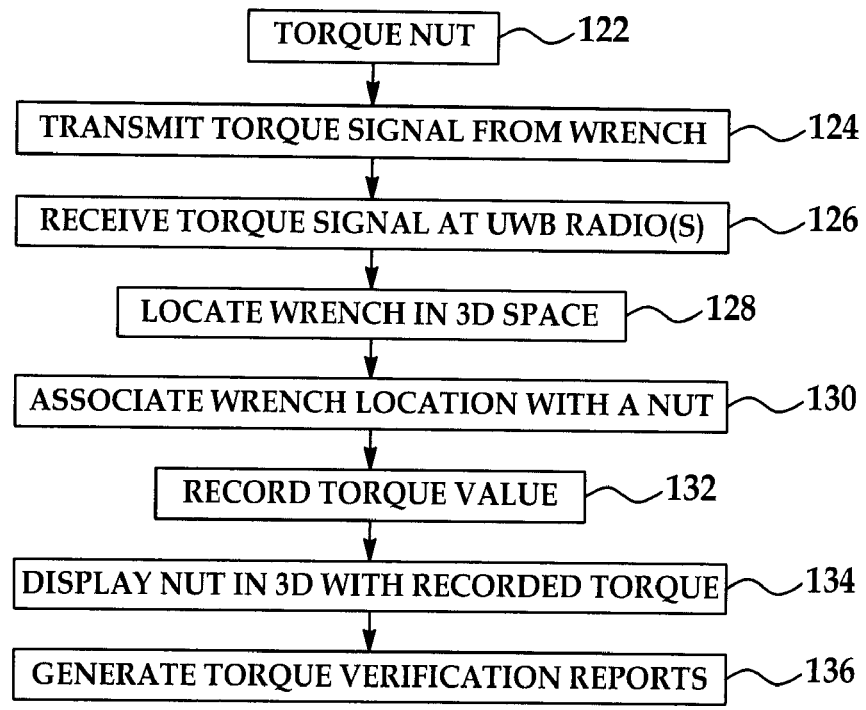
FIG. 11 is a simplified flow diagram illustrating a method for locating and reporting the completion of manufacturing operations.

Referring to FIG. 11, according to a method embodiment, torquing of the nuts 38 may be monitored, recorded and displayed. Beginning at 122, a production worker uses the electronic wrench 44 to torque a nut 38. When the strain gauge 50 (FIGS. 4 and 5) senses that the nominal or threshold torque value has been reached, the wrench 44 transmits torque signals comprising UWB pulse signals that contain the torque value, shown at step 124. The torque signals (UWB pulse signals) are received at the UWB radios 60 within the wheel well 36, as shown at 126. The resulting location measurements are then used by the processor 66 to calculate the location of the wrench 44 in three dimensional object space, as shown at 128. At 130, the processor 66 associates the wrench location with a particular nut 38, and at 132, the torque value for the nut is recorded. At 134, the processor 66 translates the location of the nut from the coordinate system 26 of the wheel well 36, to the coordinate system 34 of the three dimensional space represented by the displayed image. The nut 38 is then displayed along with the recorded torque value at 134. Torque verification reports may be optionally generated, as desired, at 136.

The disclosed embodiments described above may provide for the acquisition and display of both the location and quantitative data relating the manufacturing operation that is performed. For example, where the torque wrench 44 transmits signals that identify its location and a torque reading, both the location of the wrench 44 and the acquired torque reading may be remotely or locally recorded and displayed. However, the disclosed embodiments may also be useful where the signals transmitted from the wrench 44 contain only information indicating the location of the wrench 44. For example, when a worker initiates and/or completes a torquing operation, he or she may manually initiate the transmission of a signal from the wrench 44 using a transmit switch (not shown) on the wrench 44 which initiates transmission of a signal that indicates the location of the wrench, and inferentially, that an operation has just been initiated or taken place on a fitting at the location of the wrench.

Figures 12, 13:
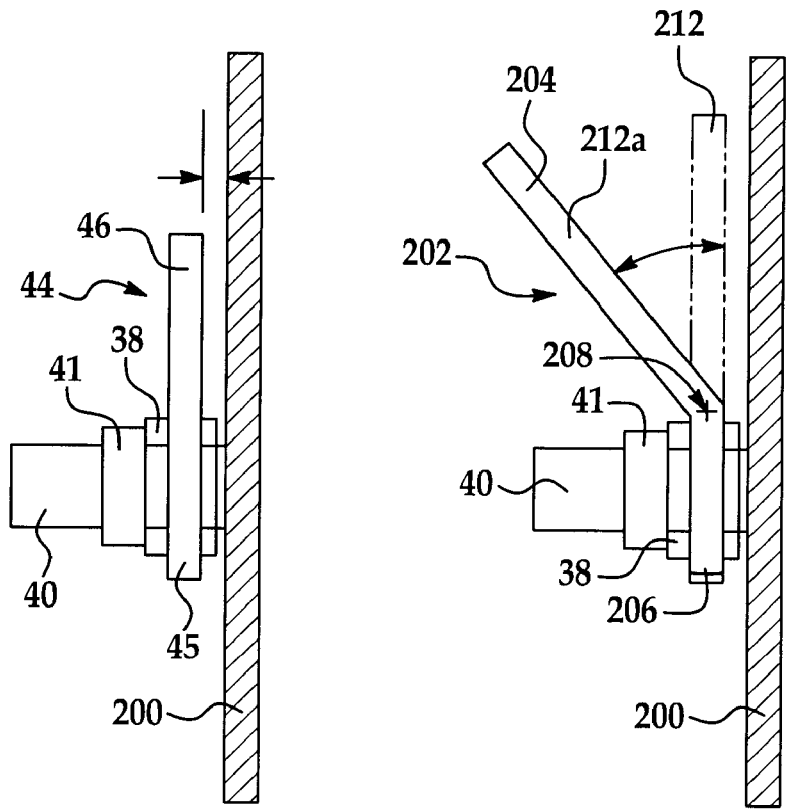
FIG. 12 is a side view of a fixed-head torque wrench placed on a fastener in proximity to an obstruction allowing limited handle clearance.
FIG. 13 is a view similar to FIG. 12 but depicting the use of a torque wrench having a flexible head to avoid the obstruction.

Referring now to FIG. 12, the head 45 of the previously described electronic torque wrench 40 may be positioned around a nut 38 used to tighten a fitting 41 on a tube 40. The position of the handle 46 is fixed relative to the head 45. In this example, the handle 46 of the wrench 44 is closely positioned next to an obstruction 200 which may comprise, for example and without limitation, a bulkhead in which the clearance space "C" is insufficient for a worker to grasp the handle 46. One solution to this problem is shown in FIG. 13 which illustrates an electronic torque wrench 202 in which the handle 204 is pivotally connected to a head 206 by means of a hinge 208, and thus may be referred to as having a "flexible head" 206. By virtue of the pivotal connection formed by the hinge 208, the handle 204 may be swung through any angle θ so that a worker may freely grasp and rotate the handle 204, free of the obstruction 200.

Figure 14:
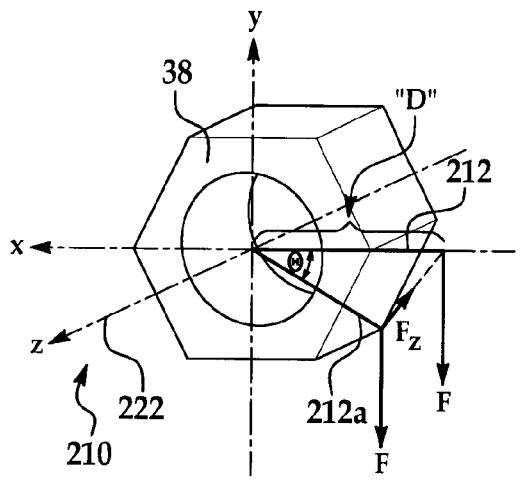
FIG. 14 is a perspective view of a nut illustrating the forces applied to the nut by a torque wrench.

Attention is also now directed to FIG. 14 which illustrates the forces applied to the nut 38 using the torque wrench 202 shown in FIG. 13. The symmetry of the nut 38 may be defined in a three dimensional coordinate system 210 comprising orthogonal x, y and z axes. The z axis forms the axis of rotation 222 of the fastener 38. The rotational force, i.e. torque, which produces rotation of the nut 38 is applied to the fastener 38 within a plane defined by the x and y axes and which is orthogonal with respect to the axis of rotation 222. When the handle 204 of the wrench 202 is axially aligned with the head 206 as shown by the dashed line position 212 in FIG. 13, the force F applied to the handle 204 acts through a distance "D" within the x-y plane to produce a torque which is the product of FxD. When, however, the handle is swung to the full line (FIG. 13) position 212a through an angle θ, a portion of the applied force F results in an "off axis" force component $F_z$ parallel to the z axis. The off-axis force component $F_z$ may result in an error in torque measurement. In other words, when the force F is not applied entirely within the x-y plane orthogonal to the axis of rotation 222, the torque readings may contain an error. This error is sometimes referred to as the "cosine error" since the magnitude of the error is proportional to the cosine of the angle θ.

Figure 15:
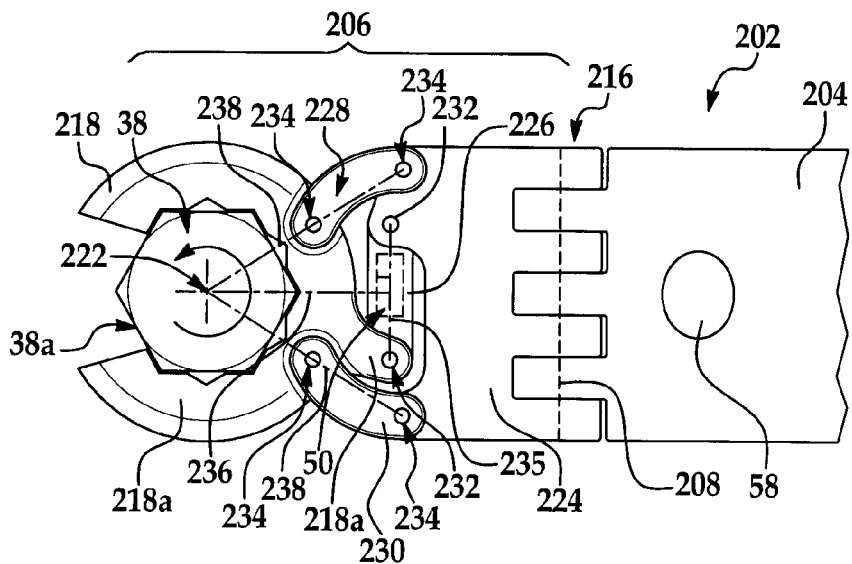
FIG. 15 is a top view of a portion of an electronic torque wrench according to one embodiment, shown engaging a fastener.
Figure 16:
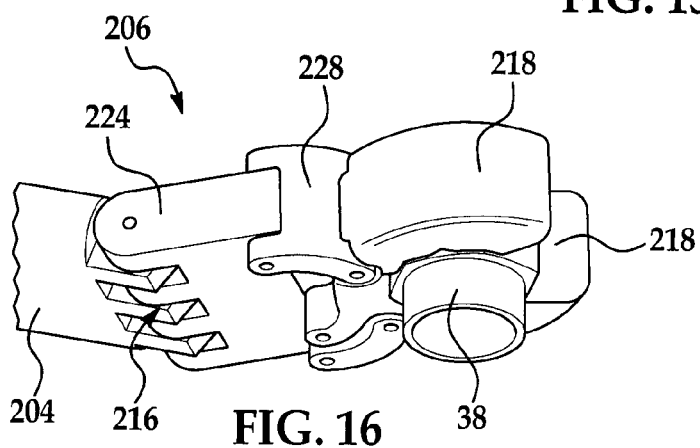
FIG. 16 is a perspective view of the torque wrench shown in FIG. 15.
Figure 17:
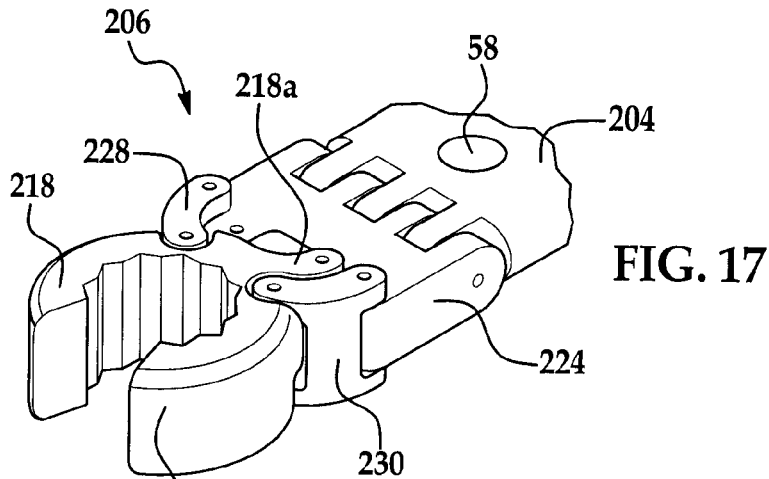
FIG. 17 is another perspective view of the torque wrench shown in FIGS. 15 and 16, but without the fastener.

Attention is now directed to FIGS. 15-17 which depict features of the electronic torque wrench 202 that may substantially eliminate cosine error. The electronic wrench 202 broadly comprises elongate handle 204 pivotally connected to head 206 by means of a hinge 216 that allows pivotal motion of the handle 204 about an axis 208. Thus, the hinge 216 allows the handle 204 to be swung or pivoted through an angle θ, out of the x-y plane shown in FIG. 14, to any of a plurality of positions in those applications where it may be necessary to avoid an obstruction 200 (FIG. 13).

The head 206 broadly comprises the first head portion 218 that engages the nut 38 and a second head portion 224 pivotally connected to the end of the handle 204 by means of the hinge 216. In the illustrated example, the first head portion 218 comprises opposing jaws 218a which engage flats 38a of the nut 38, however the first head portion 218 may have other geometries such as a socket configuration (not shown), depending on the application. The first and second head portions 218, 224 are pivotally connected by means of a torque reacting first link 226, and second and third connecting links 228, 230.

The torque reacting first link 226 is elongate and has its opposite ends respectively pivotally connected at pivot points 232 to an ear 218a on the first head portion 218, and to the second head portion 224. The torque reacting first link 226 has a longitudinal axis 235 which passes through pivot points 232 and extends perpendicular to a reference line 236 passing through the rotational axis 222 of the nut 38. The connecting links 228 are positioned on opposite sides of the torque reacting first link 226 and each have their opposite ends pivotally connected at pivot points 234, respectively to the first and second head portions 218, 224. Reference lines 238 connecting the pivot points 234 of each of the connecting links 228 each pass through the rotational axis 222.

Although the connecting links 228, 230 are positioned on opposite sides of the torque transmitting first link 226 in the illustrated example, other arrangements are possible; for example, the connecting links 228, 230 may be mounted on the same side of the torque reacting first link 226, or may lie in different planes. It should also be noted here that the use of more than two connecting links 228, 230 may be possible or desirable in some applications. While the illustrated hinge 216 employs pivotal connections formed by the pivotal links 228, 230, other types of flexible connections may be possible, using for example and without limitation, ball joints (not shown) and/or sliding joints (not shown).

An electronic strain gauge sensor 50 is mounted on the torque reacting first link 226 and functions to measure the amount of strain created in link 226 as a result of the force transmitted from the second head portion 224 to the first head portion 218 solely through the torque reacting first link 226. While a strain gauge sensor 50 has been illustrated in the disclosed embodiment, other types of sensors (not shown) may be employed to measure the torque transmitted through the torque reacting first link 226.

From the forgoing description, it may be appreciated that the torque reacting first link 226 along with the strain gauge 50 provide a means, located entirely within the flexible head 206 for measuring the amount of torque applied to the fastener 38. As a result of this arrangement, the measured torque readings are substantially unaffected by the pivotal position of the handle 204.

In operation, a force applied to the handle 204 is transmitted through the hinge 216 to the second head portion 224, which transmits the applied force through links 226, 228 and 230 to the first head portion 218 where it is applied to the fastener 38. The torque reacting first link 226 essentially isolates that portion of the force applied to the fastener 38 that results in a torque on the fastener 38, i.e. the force applied to the fastener 38 that is perpendicular to the axis of rotation 222, from the component $F_z$ of the force that is applied "off-axis", i.e., not perpendicular to the axis of rotation 222. The off-axis component $F_z$ of the force applied to the fastener 38 is transmitted substantially entirely through the second and third links 228, 230. Links 228, 230 thus form pivotal connections that hold the torque reacting first link 226 in a substantially fixed position on the wrench 202, and react against the off-axis component $F_z$ of the applied force F.

The electronic torque wrench 202 may be similar in other respects to the previously described electronic torque wrench 44 shown in FIGS. 4 and 5. For example and without limitation, the torque wrench 202 may include a measuring and trigging circuit 57 which functions to cause a transmitter 52 in the handle 204 to transmit wireless signals indicating the location and/or magnitude of the sensed torque. Similarly, the wrench 202 may include an annunciator 58 which may comprise, for example and without limitation, the LED shown in the drawings.

Figure 18:
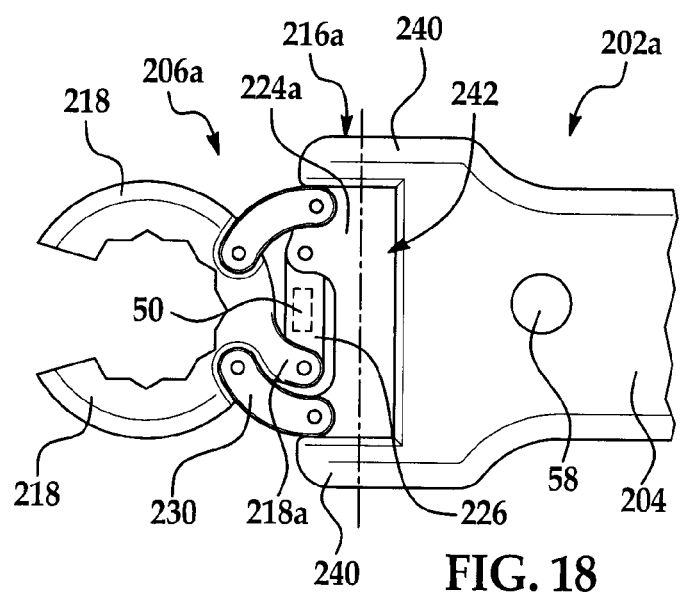
FIG. 18 is a top view of another embodiment of the electronic torque wrench.
Figure 19:
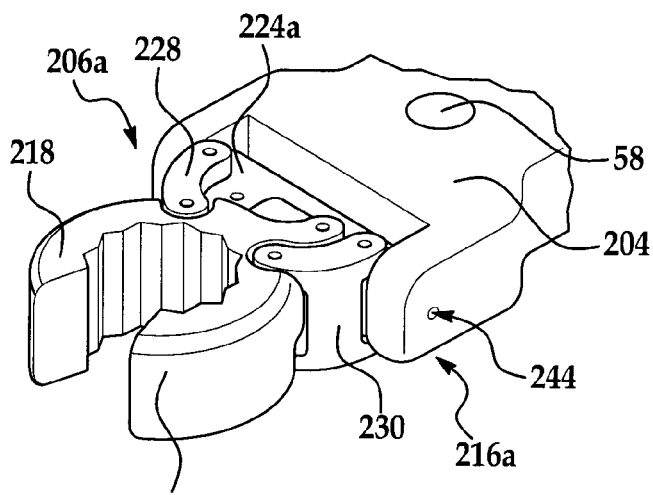
FIG. 19 is a perspective view of the electronic torque wrench shown in FIG. 18.

An alternate embodiment of the electronic torque wrench 202a is illustrated in FIGS. 18 and 19. Torque wrench 202a is similar to that previously described in connection with FIGS. 15-17, but includes an alternate form 216a of the hinge wherein the second head portions 224a is configured to be received within an opening 242 defined between spaced apart tines 240 that are integrally formed with the end of the handle 204. Pins 244 pivotally connect the opposite ends of the second head portion 224 with the tines 240.

Figure 20:
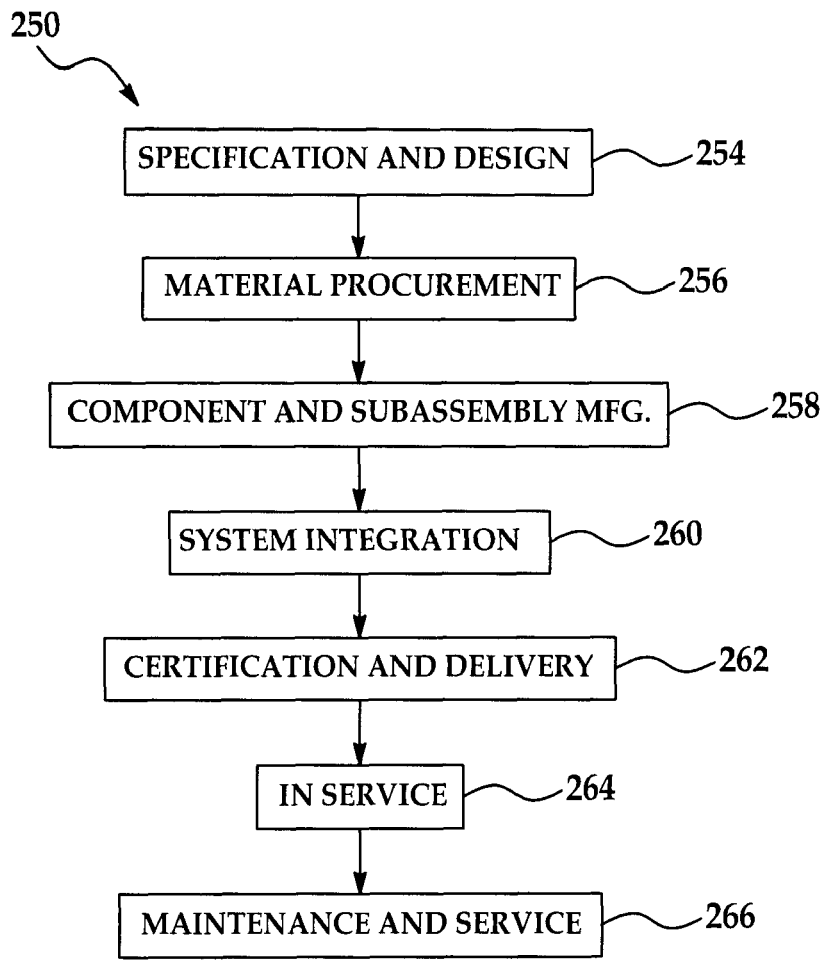
FIG. 20 is a flow diagram of aircraft production and service methodology.
Figure 21:
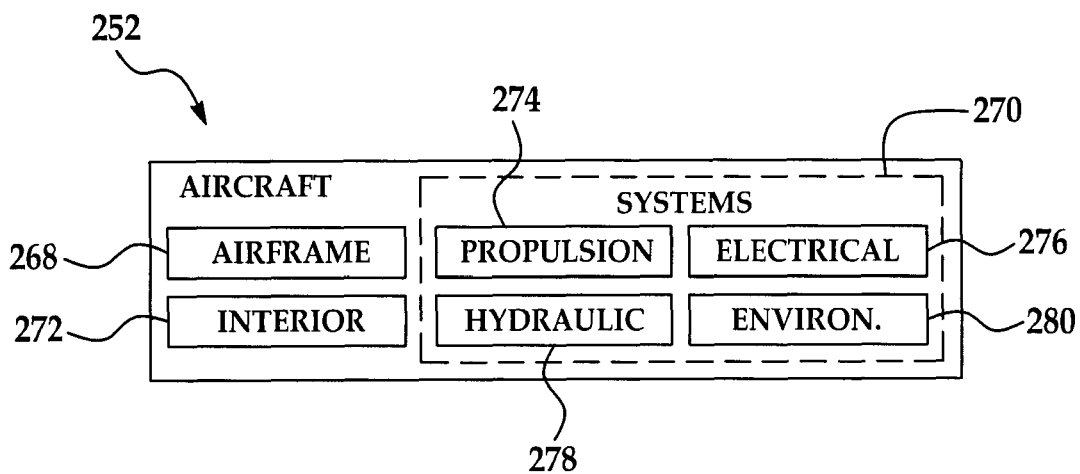
FIG. 21 is a block diagram of an aircraft.

Embodiments of the disclosure may find use in a variety of potential applications, particularly in the transportation industry, including for example, aerospace, marine and automotive applications. Thus, referring now to FIGS. 20 and 21, embodiments of the disclosure may be used in the context of an aircraft manufacturing and service method 250 as shown in FIG. 20 and an aircraft 252 as shown in FIG. 21. During pre-production, exemplary method 250 may include specification and design 254 of the aircraft 252 and material procurement 256. During production, component and subassembly manufacturing 258 and system integration 260 of the aircraft 252 takes place. Thereafter, the aircraft 252 may go through certification and delivery 262 in order to be placed in service 264. While in service by a customer, the aircraft 252 is scheduled for routine maintenance and service 266 (which may also include modification, reconfiguration, refurbishment, and so on).

Each of the processes of method 250 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 21, the aircraft 252 produced by exemplary method 250 may include an airframe 268 with a plurality of systems 270 and an interior 272. Examples of high-level systems 270 include one or more of a propulsion system 274, an electrical system 276, a hydraulic system 278, and an environmental system 280. Any number of other systems may be included. Although an aerospace example is shown, the principles of the disclosure may be applied to other industries, such as the marine and automotive industries.

Systems and methods embodied herein may be employed during any one or more of the stages of the production and service method 250. For example, components or subassemblies corresponding to production process 258 may be fabricated or manufactured in a manner similar to components or subassemblies produced while the aircraft 250 is in service. Also, one or more apparatus embodiments, method embodiments, or a combination thereof may be utilized during the production stages 258 and 260, for example, by substantially expediting assembly of or reducing the cost of an aircraft 250. Similarly, one or more of apparatus embodiments, method embodiments, or a combination thereof may be utilized while the aircraft 250 is in service, for example and without limitation, to maintenance and service 266.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A system for monitoring the completion of manufacturing operations in a manufacturing environment, comprising:
   means for determining when an operation on a part using a tool has been completed, said operation comprising mechanical coupling of said tool and said part, said operation comprising movement of said tool;
   means for wirelessly transmitting a radio frequency signal from the tool indicating that the operation has been completed;
   means for locating the three-dimensional (3D) position of the operation by calculating the position of said tool in a coordinate system of the manufacturing environment, said calculating using an angle and time of arrival of said transmitted signal;
   a data set representing a three-dimensional (3D) image of the manufacturing environment; and,
   means for displaying the 3D image of the manufacturing environment and for displaying the location of the completed operation within the 3D image.

2. The system of claim 1, wherein the means for locating the 3D position of the operation includes:
   at least two radio receivers within the manufacturing environment for receiving the transmitted signal and for generating position measurements related to the 3D position of the tool, and
   means for calculating the location of the tool, using the position measurements.

3. The system of claim 1, wherein the tool includes:
   a torque wrench for torquing a fastener,
   a strain gauge sensor on the torque wrench for sensing the magnitude of torque applied to the fastener and for generating a signal related to the magnitude of sensed torque, and
   a trigger circuit for triggering the operation of the wireless transmitter means to transmit the signal indicating that the operation has been completed.

4. The system of claim 1, wherein:
   the manufacturing environment is an aircraft undergoing assembly, and
   the manufacturing operations include assembling parts inside the aircraft.

5. The system of claim 1, further comprising:
   a processor for translating the 3D position of the completed operation in a coordinate system of the manufacturing environment to a 3D position in a coordinate system of the 3D image of the manufacturing environment.

6. A system for monitoring the completion of an operation performed on subassemblies within a manufacturing environment, comprising:
   a portable tool for performing an operation on each of the subassemblies, said operation comprising mechanical coupling of said tool and said subassembly and movement of said tool;
   a wireless transmitter on the tool for wirelessly transmitting a radio frequency signal indicating the tool has completed an operation on one of the subassemblies;
   means for calculating the position of the tool and thereby locating the position of said one of the subassemblies in a first three-dimensional (3D) coordinate system of the manufacturing environment, said calculating using an angle and time of arrival of the transmitted signal;

a data set representing a 3D image of the manufacturing environment in a second 3D image coordinate system;

a processor coupled with the locating means and the data set for converting the 3D position of the tool located in the first coordinate system to a 3D position in the second coordinate system; and, display means for displaying the location of said one of the subassemblies in a 3D image of the manufacturing environment.

7. The system of claim 6, wherein the tool is a torque wrench, and the torque wrench includes:

means for sensing when the torque wrench has applied a preselected level of torque to the subassembly, and a trigger circuit coupled with the sensing means for triggering the operation of the wireless transmitter when the sensing means has sensed that the preselected level of torque has been applied to the subassembly.

8. The system of claim 6, wherein:

the manufacturing environment comprises a radio frequency (RF) environment, the transmitted signal is an ultra wide band (UWB) pulse signal, and the locating means includes— a plurality of UWB radio receivers within the manufacturing environment for receiving the transmitted UWB pulse signal and for generating position measurement related to the position of the tool with the manufacturing environment, and a processor for calculating the 3D position of the tool within the manufacturing environment using the position measurements.

9. The system of claim 8, wherein each of the subassemblies is within the line-of-sight of at least two of the UWB radio receivers.

10. The system of claim 6, wherein:

the manufacturing environment is an aircraft undergoing assembly, and the subassemblies include fasteners tightened by the tool.

11. The system of claim 6, wherein the display means includes:

first display remote from the manufacturing environment, and a second, portable display used by an assembly worker for performing the operation on the subassemblies.

12. The system of claim 6, wherein:

each of the subassemblies includes a fastener, the tool is a torque wrench, and the torque wrench includes— a handle, a head pivotally coupled with the handle for allowing the handle to pivot to any of a plurality of positions relative to the head, the head including means for engaging and applying torque to the fastener about a rotational axis, and, means for measuring the amount of torque applied to the fastener irrespective of the pivotal position of the handle.

13. A method of monitoring operations performed on subassemblies within a manufacturing environment, comprising:

moving a tool to a location of one of the subassemblies;

using the tool to complete an operation on the subassembly, said operation comprising mechanical coupling of said tool and said subassembly and movement of said tool;

wirelessly transmitting a radio frequency signal from the tool upon completion of the operation indicating that the operation on the subassembly has been completed;

receiving the transmitted signal;

using an angle and time of arrival of the received signal to calculate the position of the tool and thereby locate the position of said subassembly in a three dimensional (3D) coordinate system of the manufacturing environment;

providing a 3D data file representing a 3D image of the manufacturing environment;

converting the located position of the tool in the 3D coordinate system of the manufacturing environment to a position in a coordinate system of the 3D image of the manufacturing environment; and, displaying the subassembly on which the operation was completed within the 3D image of the manufacturing environment.

14. The method of claim 13, wherein:

the subassemblies include fasteners, moving the tool to the location of one of the subassemblies includes moving a wrench to a fastener on the subassembly, using the tool to complete an operation includes using the wrench to tighten the fastener, and displaying the subassembly includes displaying the fastener. tightened by the wrench.

15. The method of claim 14, further comprising:

measuring the level of torque applied to the fastener, and wherein transmitting the wireless signal includes transmitting the measured level of torque, and displaying the fastener includes displaying the measured level of torque.

16. The method of claim 13, wherein converting the located position of the tool is performed by a processor.

17. The method of claim 13, wherein displaying the subassembly includes displaying the subassembly on a portable display used by an assembly worker to complete the operation on the subassembly.

18. The method of claim 13, wherein;

the manufacturing environment is an aircraft undergoing assembly, and the operations performed on the subassemblies include assembling parts inside the aircraft.

19. The method of claim 13, wherein:

the manufacturing environment comprises a radiofrequency (RF) environment, transmitting the signal includes transmitting an ultra wide band (UWB) pulse signal, and receiving the transmitted signal includes receiving the UWB pulse signal at at least two locations within the manufacturing environment, wherein using the received signals to locate the position of the tool includes measuring the received UWB pulse signals and calculating the position of the tool using the measurements.

20. The method of claim 13, wherein:

the subassembly includes a fastener, the tool includes a wrench, using the tool to complete an operation includes using the wrench to tighten the fastener, and displaying the subassembly includes displaying the fastener that has been tightened with the wrench.

21. The method of claim 13, wherein:

wirelessly transmitting the signal includes transmitting a quantitative parameter related to the completed operation.

22. A method of verifying that fasteners have been properly torqued on subassemblies on an aircraft, comprising:
- moving a torque wrench to the location of each subassembly;
- using the torque wrench to torque a fastener on the subassembly to a preselected value;
- using a strain gauge sensor on the wrench to sense the level of torque applied to the fastener by the torque wrench;
- wirelessly transmitting a radio frequency signal from the torque wrench indicating that the fastener has been torqued to the preselected value;
- using an angle and time of arrival of the transmitted signal to calculate a position of the torque wrench and thereby determine the location of the fastener in a three-dimensional (3D) coordinate system of the aircraft;
- providing a data set representing a 3D image of the subassembly;
- converting the location of the fastener in the 3D coordinate system of the aircraft to the coordinate system of the 3D image of the subassembly; and,
- displaying a 3D image of the subassembly along with an image of the fastener that has been torqued to the preselected value at the location of the wrench.

23. A system for verifying that fasteners have been properly torqued on subassemblies during the production of an aircraft, comprising:
- a torque wrench for torquing the fasteners;
- a strain gauge sensor on the torque wrench for sensing the level of torque applied by the torques to each of the fasteners;
- a wireless transmitter on the torque wrench for transmitting a radio frequency signal indicating that a fastener has been properly torqued;
- a triggering circuit for triggering the transmitter to transmit the signal when the strain gauge sensor senses that said fastener has been properly torqued;
- a plurality of radio receivers for receiving the transmitted signal and for producing location measurements related to the location of the torque wrench, said location measurements determined using an angle and time of arrival of said transmitted signal;
- a data set representing a three-dimensional (3D) image of the subassembly;
- a processor for calculating the position of the torque wrench using the position measurements and thereby determining the position of said fastener, and for converting the calculated location of the torque wrench and determined position of said fastener within a coordinate system of the aircraft to a coordinate system of the 3D image of the subassembly;
- a display for displaying the 3D image of the subassembly showing the location of the fastener.

* * * * *